United States Patent [19]
Brown

[11] 4,382,709
[45] May 10, 1983

[54] ON-AXIS FLEX WEB GIMBAL

[75] Inventor: Donald G. Brown, Newbury Park, Calif.

[73] Assignee: Rockwell International Corporation, El Segundo, Calif.

[21] Appl. No.: 248,190

[22] Filed: Mar. 30, 1981

[51] Int. Cl.³ .............................................. F16D 3/00
[52] U.S. Cl. .................................. 403/57; 464/147; 308/2 A
[58] Field of Search .................. 308/2 A; 74/5 F; 403/57, 58; 248/476, 487, 179; 464/147

[56] References Cited

U.S. PATENT DOCUMENTS 2,612,764 10/1952 Wikey .................................. 464/147
2,756,573 7/1956 Colby et al. ..................... 464/147 X
3,428,915 2/1969 Leone et al.
3,955,440 5/1976 Newell
3,993,402 11/1976 Fredrick, Jr.
4,060,315 11/1977 Heinz Primary Examiner—Andrew V. Kundrat
Attorney, Agent, or Firm—H. Fredrick Hamann; Harry B. Field

[57] ABSTRACT

A two-dimensional flexure gimbal-type coupling in which rectangular flexure members allow limited rotation about two mutually perpendicular intersecting axes. The coupling utilizes two pairs of flexure members arranged in two mutually perpendicular planes when unflexed, the planes intersecting along an axis lying between the flexure members of both pairs. Each pair of flexures are attached to respective spaced frame members along one edge. A coupling member is attached to the opposite edges of all the flexure members in such a manner that the edges of one pair of flexure members where attached to a frame member lie in a common plane with the edges of the other pair of flexure members where attached to the coupling member.

7 Claims, 4 Drawing Figures

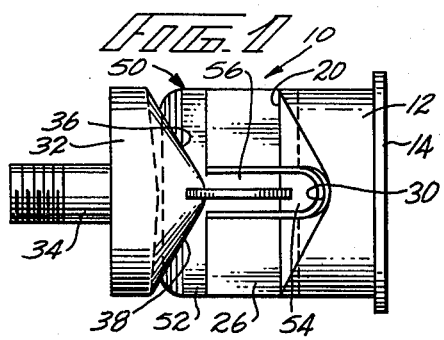
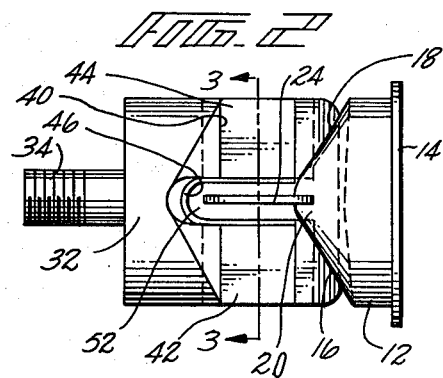
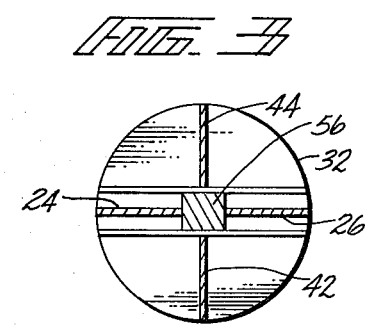

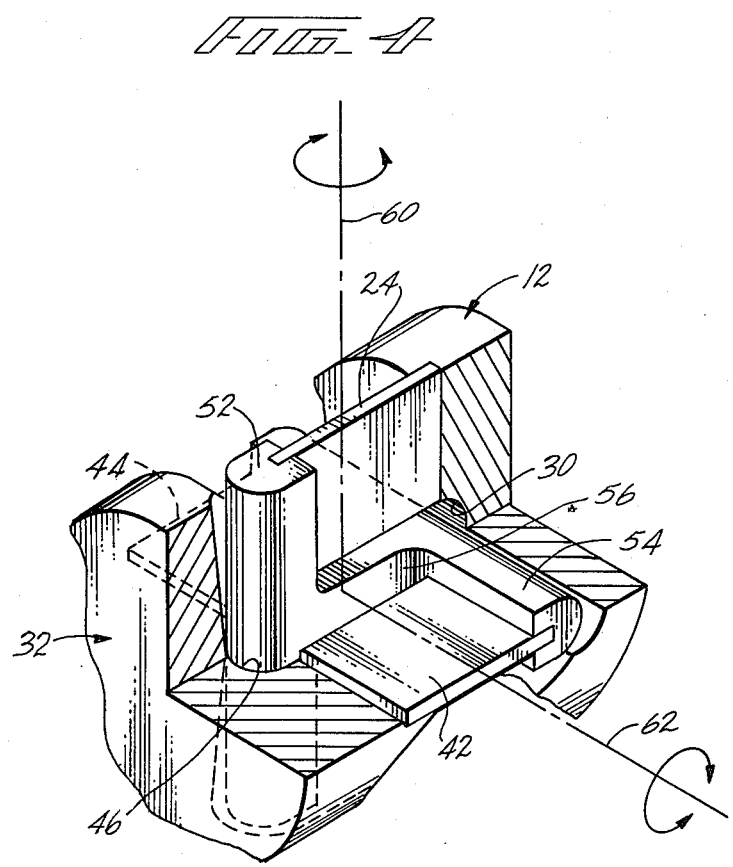

ON-AXIS FLEX WEB GIMBAL

STATEMENT OF GOVERNMENT INTEREST

The Government has the right in this invention pursuant to Contract No. F29601-80-C-0041 awarded by the U.S. Department of Defense.

FIELD OF THE INVENTION

This invention relates to a gimbal-type coupling, and more particularly, to two-dimensional flexure coupling which allows tilting about two mutually perpendicular axes.

BACKGROUND OF THE INVENTION

Adjustable mountings for optical elements such as laser mirrors are required to have high rigidity while still permitting some adjustment. The mounting must not transfer any distortion load to the mirror, either due to adjustment of the mirror position or due to temperature variations. The ideal support configuration is a three-point kinematic mount with actuators for adjusting each mount to achieve optical alignment of the mirror. Precision mirror mounts have been provided, such as described in U.S. Pat. No. 4,060,315, which utilize spring-type flexures. Such spring arrangements, however, may not be sufficiently rigid to prevent some movement of the mirror mount under high accelerating forces. Gimbal-type mounts have also been used to allow actuation to occur without introducing distortion loads on the mirror. See, for example, U.S. Pat. No. 3,993,402. Such gimbal mounts must utilize bearings which permit no looseness whatsoever and must provide that both axes of the two degrees of freedom of the gimbal be coincident with each other and the C.G. of the mirror. While a flexure-type gimbal, such as shown in U.S. Pat. No. 3,955,440, has the advantage that it eliminates any looseness associated with bearings, for example, flexure-type couplings having two degrees of freedom have generally not provided coincident or intersecting axes and therefore may introduce adjustment errors. Other known flexure designs, such as shown in U.S. Pat. No. 3,428,915, may lack adequate rigidity and strength or may be difficult and costly to machine and construct.

SUMMARY OF THE INVENTION

The present invention is directed to an improved gimbal-type mounting or two-dimensional coupling utilizing flexures as the pivot elements. The coupling design of the present invention is very rugged, relatively inexpensive to construct, compact and very rigid for all degrees of motion other than the pivoting action along the two gimbal axes. Moreover, the flexure design of the present invention provides coincident or intersecting hinge axes for the gimbal-type mounting.

These and other advantages of the present invention are achieved by providing a two-dimensional flexure coupling comprising first and second pairs of spaced apart thin flexure members, each pair lying in a common plane and each member of a pair having spaced parallel edges with the edges of the respective flexure members of a pair being aligned with each other. The planes of the two pairs are mutually perpendicular and intersect along a line extending between the two flexure members of each pair. The first pair of flexure members is anchored to a first frame member in cantilever fashion, and a second frame member is similarly secured to the flexure members of the second pair. A rigid coupling member is secured to the opposite edges of both pairs of flexure members. The centerlines between the two secured edges of all four flexure members, which correspond to the hinge axes, lie in a common plane.

BRIEF DESCRIPTION OF THE DRAWINGS

For a better understanding of the invention, reference should be made to the accompanying drawings, wherein:

FIG. 1 is a side elevational view of the flexure coupling;

FIG. 2 is a top view of the flexure coupling;

FIG. 3 is a sectional view taken substantially on the line 3—3 of FIG. 2; and

FIG. 4 is a cutaway perspective view of the coupling unit.

DETAILED DESCRIPTION

Referring to the drawings in detail, the numeral 10 indicates generally a coupling unit of the present invention which is used to provide one mounting element for a laser mirror or other optical device (not shown). The flexure coupling includes a first frame member 12 which may include a flange 14 or other suitable means for mounting the frame member to a linear actuator or other suitable supporting base. While the frame member is preferably cylindrical in shape, the shape of the frame member can take a variety of forms. One end of the first frame member 12 is tapered toward the center, as best seen in FIG. 2 by tapered surfaces 16 and 18. These surfaces intersect to form a projecting diametrically extending ridge 20. A slot or groove extending lengthwise of the ridge receives one edge of a pair of thin, flat rectangular flexure members 24 and 26. The two flexure members 24 and 26 are secured in the slot by welding, brazing, or other suitable means so as to lie in a common plane with their adjacent edges spaced apart, as shown in FIG. 1. The frame member 12 is provided with a notch or groove 30 extending transverse to the ridge 20 between the inner adjacent edges of the flexure members 24 and 26.

A substantially identical second frame member 32 has a mounting stud 34, for example, for anchoring it to the mirror or other device. The second frame member has tapered surfaces 36 and 38 terminating in a ridge 40. The ridge 40 is slotted to receive one edge of a pair of flexure members 42 and 44. The flexure members are secured in the slot in spaced apart position and lying in a common plane. The second frame member is provided with a notch or groove 46 extending between the two flexure members 42 and 44.

The two pairs of flexure members are joined with their respective planes perpendicular to each other by a coupling member, indicated generally at 50. A first longitudinal section 52 of the coupling member 50 has a groove along one side for receiving the edges of the flexure members 24 and 26. The first section extends through the notch 46 in the second frame member 32 so that the common edge along which the two flexure members 24 and 26 are attached to the first section 52 of the coupling member 50 lies in a common plane with the ridge 40 where the flexure members 42 and 44 are secured to the second frame member 32.

The coupling member 50 includes a second longitudinal section 54 extending through the notch 30 in the first frame member 12 and having a groove therein in which the flexure members 42 and 44 are secured. The sections 52 and 54 are joined by an integral transverse section 56 of the coupling member 50 which is positioned in the space between the pair of flexure members 24 and 26 and the space between the flexure members 42 and 44. Again, the junction between the flexure members 24 and 26 and the ridge 20 of the first frame member 12 lies in a common plane with the junction between the flexure members 42 and 44 and the second section 54 of the coupling member 50.

As best seen in FIG. 4, the two pairs of flexure members are arranged in mutually perpendicular planes, allowing gimbaling action between the first and second frame members about two mutually perpendicular axes, indicated at 60 and 62. These axes intersect and lie in a common plane which bisects the four flexure members. It should be noted that the bottoms of the notches 30 and 46 are preferably tapered or slanted from the center outwardly to permit the coupling member sections 52 and 54 to move freely relative to the frame members with flexing along either of the two axes 60 and 62. It should be noted that the coupling member 50 can be machined out of a single piece of material or the two sections 52 and 54 may be welded, brazed, or otherwise secured to the transverse section 56. Also, the flexure members may be welded, brazed, or otherwise secured in the respective slots so as to provide a rigid connection at opposite edges of the flexure members respectively to one of the frame members and to the coupling member.

It is to be understood that what has been described is merely illustrative of the principles of the invention and that numerous arrangements in accordance with this invention may be devised by one skilled in the art without departing from the spirit and scope thereof.

What is claimed is:

1. A two-dimensional flexure coupling comprising: a first frame member, a first pair of thin flat flexure members lying in a first common plane and secured in cantilever fashion along one edge to the first frame member, said edge of the respective flexure members of said first pair of flexure members extending along a common axis, a second frame member, a second pair of thin flat flexure members lying in a second common plane perpendicular to said first plane and said first common axis and secured in cantilever fashion along one edge to the second frame member, said edge of the respective flexure members of said second pair of flexure members extending along a common axis extending perpendicular to said first common plane, and a coupling member having first longitudinal section, a second longitudinal section and transverse longitudinal section joined at either end respectively to the middle of the first and second longitudinal sections, the longitudinal axes of the first and second longitudinal sections being perpendicular to each other and to the longitudinal axis of the transverse section, the first pair of flexure members being secured to the first longitudinal section of the coupling member on either side of the transverse section along a common axis and the second pair of flexure members being secured to the second longitudinal section of the coupling member on either side of the transverse section along a common axis.

2. The apparatus of claim 1 wherein the first and second frame members each have a notch between the pair of attached flexure members for providing clearance for a longitudinal section of the coupling member.

3. The apparatus of claim 1 wherein the common axis formed by the junction between either pair of flexure members and a frame member lies in a common plane with the common axis formed by the junction between the other pair of flexure members and a respective one of said longitudinal sections of the coupling member.

4. A two-dimensional flexure coupling comprising first and second pairs of spaced apart thin flat flexure members, each pair lying in a common plane and each member of a pair having spaced parallel edges with said edges of the respective flexure members of a pair aligned with each other, said common planes being perpendicular to each other and intersecting along a line extending between the flexure members of both pairs, a first frame member secured to both flexure members of the first pair along one of said aligned edges, a second frame member secured to both flexure members of the second pair along one of said edges, and a rigid coupling member secured respectively to the remaining aligned edges of both pairs of flexure members.

5. Apparatus of claim 4 in which the coupling member joins the first pair of flexure members in common plane with the junction between the second pair of flexure members and the second frame member and the coupling member joins the second pair of flexure members in a common plane with the junction between the first pair of flexure members and the first frame member.

6. Apparatus of claim 5 in which the coupling member includes a first section extending transverse to and between the first pair of flexure members, the second pair of flexure members being secured to said first section, a second section extending transverse to and between the second pair of flexure members, the first pair of flexure members being joined to said second section, and a transverse section joining the first and second sections, the transverse section extending parallel to and between both pairs of flexure members.

7. Apparatus of claim 6 wherein the first and second frame members are notched between the attached flexure members to provide clearance for the first and second sections of the coupling member when the flexure members are bent.

* * * * *